US010674715B2

(12) United States Patent
Furuya

(10) Patent No.: US 10,674,715 B2
(45) Date of Patent: Jun. 9, 2020

(54) FISHING SOFT LURE

(71) Applicant: Globeride, Inc., Tokyo (JP)

(72) Inventor: Hideyuki Furuya, Tokyo (JP)

(73) Assignee: GLOBERIDE, Inc., Tokyo (JP)

( * ) Notice: Subject to any disclaimer, the term of this patent is extended or adjusted under 35 U.S.C. 154(b) by 0 days.

(21) Appl. No.: 15/058,387

(22) Filed: Mar. 2, 2016

(65) Prior Publication Data

US 2016/0345557 A1 Dec. 1, 2016

(30) Foreign Application Priority Data

May 29, 2015 (JP) .................................. 2015-110532
Jul. 13, 2015 (JP) .................................. 2015-139329

(51) Int. Cl.
A01K 85/00 (2006.01)
(52) U.S. Cl.
CPC ..................................... A01K 85/00 (2013.01)
(58) Field of Classification Search
CPC ........................................................ A01K 85/00
See application file for complete search history.

(56) References Cited

U.S. PATENT DOCUMENTS

| 1,881,947 A | 10/1932 | Rawdon | |
|---|---|---|---|
| 2,534,482 A * | 12/1950 | Terhorst | A01K 85/18 43/42.02 |
| 2,785,497 A * | 3/1957 | Cordell | A01K 85/16 43/42.26 |
| 3,376,663 A * | 4/1968 | Amrine | A01K 85/16 43/42.02 |
| D239,447 S * | 4/1976 | Radcliff | A01K 85/00 D22/127 |
| 3,978,606 A | 9/1976 | Riggs | |
| 4,069,610 A * | 1/1978 | Firmin | A01K 85/16 43/42.24 |

(Continued)

FOREIGN PATENT DOCUMENTS

| AO | 2014-100134 A | 6/2014 |
|---|---|---|
| CN | 102461485 A | 5/2012 |

(Continued)

OTHER PUBLICATIONS

Office Action dated Dec. 27, 2016 in Taiwanese Application 105109584.

(Continued)

Primary Examiner — Michael H Wang
(74) Attorney, Agent, or Firm — DLA Piper LLP (US)

(57) ABSTRACT

Provided is a soft lure in which interference in movements between adjacent wobbling portions in a front-rear direction is reduced. A soft lure according to one embodiment has a body and a plurality of legs each projecting out from a side of the body and arranged along a moving direction of the soft lure. The legs wobble in accordance with water flow when the soft lure moves. At least one leg among the plurality of legs has a connected portion connected with the body (trunk) where a thickness in an upper-lower direction is smaller than a thickness in the moving direction, and has a substantially middle portion situated outer from the connected portion. In the middle portion of the leg, a thickness in the upper-lower direction is larger than a thickness in the moving direction.

16 Claims, 6 Drawing Sheets

(56) References Cited

U.S. PATENT DOCUMENTS

| | | | |
|---|---|---|---|
| 4,862,630 A | 9/1989 | Welch | |
| 4,885,867 A * | 12/1989 | Leal | A01K 85/00 43/42.26 |
| 5,009,024 A * | 4/1991 | Parman | A01K 85/00 43/42.03 |
| 5,105,573 A | 4/1992 | Mays | |
| 5,494,432 A * | 2/1996 | Coggins | A01K 85/00 425/546 |
| 5,934,008 A * | 8/1999 | Rice | A01K 85/00 43/42.24 |
| 5,996,271 A * | 12/1999 | Packer | A01K 85/00 43/42.06 |
| 6,094,855 A | 8/2000 | Stump | |
| 6,212,818 B1 * | 4/2001 | Huddleston | A01K 85/00 43/42.09 |
| 7,266,922 B2 * | 9/2007 | Oelerich, Jr. | A01K 85/00 43/42.24 |
| 7,484,327 B2 * | 2/2009 | Moore | A01K 85/00 43/42.28 |
| D604,796 S * | 11/2009 | Wyatt | D22/127 |
| 7,730,658 B1 * | 6/2010 | Biffle | A01K 85/00 43/42.23 |
| 7,730,659 B1 * | 6/2010 | Gros | A01K 85/00 43/42.24 |
| 7,774,974 B1 * | 8/2010 | Parks | A01K 85/01 43/42.24 |
| 8,020,338 B2 * | 9/2011 | Brown | A01K 85/01 43/42.02 |
| 8,037,635 B1 * | 10/2011 | Wyatt | A01K 85/00 43/42.15 |
| 8,156,682 B2 * | 4/2012 | Dahlberg | A01K 85/16 43/42.1 |
| 8,230,640 B2 * | 7/2012 | Meroney | A01K 85/16 43/42.24 |
| 8,733,013 B1 | 5/2014 | Jones, Jr. et al. | |
| 2005/0172538 A1 * | 8/2005 | Brinkman | A01K 83/06 43/42.36 |
| 2005/0204607 A1 * | 9/2005 | Nichols | A01K 85/00 43/42.37 |
| 2007/0124984 A1 * | 6/2007 | Mell | A01K 85/00 43/42.26 |
| 2008/0289243 A1 * | 11/2008 | Huddleston | A01K 85/00 43/41 |
| 2012/0180372 A1 * | 7/2012 | Kennedy | A01K 85/00 43/4.5 |
| 2014/0115944 A1 | 5/2014 | Thomas | |
| 2015/0230441 A1 * | 8/2015 | Steer | A01K 85/00 43/42.09 |
| 2016/0330946 A1 * | 11/2016 | Sarris | A01K 85/02 |

FOREIGN PATENT DOCUMENTS

| | | |
|---|---|---|
| CN | 202340629 U | 7/2012 |
| CN | 202425478 U | 9/2012 |
| JP | 3189473 | 3/2014 |
| JP | 2015070858 A | 4/2015 |

OTHER PUBLICATIONS

Extended European Search Report dated Jan. 13, 2017 for Appln. No. 16159938.6.

Partial European Search Report dated Oct. 4, 2016 for Application No. 16159938.6.

Non-final Office Action issued in corresponding Korean Patent Application No. 10-2016-0028208 dated Apr. 19, 2018 with English translation.

Office Action Japanese Patent Application No. 2015-110532 dated Jun. 19, 2018 with English translation.

Daiwa Fishing Tackle Catalog 2014, Globeride, Inc., Jan. 27, 2014, pp. 247-253 with partial English translation.

Extended European Search Report EP Application No. 17182270.3 dated Nov. 15, 2017.

Decision of Refusal dated Aug. 14, 2018 issued in corresponding Japanese Patent Application No. 2015-110532 with English language translation.

First Office Action dated Sep. 25, 2018 issued in corresponding Chinese Patent Application No. 20161086000.4 with English Translation.

The Third Office Action dated Jan. 19, 2020, of counterpart Chinese Application No. 201610186000.4, along with an English translation.

The Second Office Action dated Jun. 4, 2019, of counterpart Chinese Application No. 201610186000.4, along with an English translation.

* cited by examiner

FISHING SOFT LURE

CROSS-REFERENCE TO RELATED APPLICATIONS

This application is based on and claims the benefit of priority from Japanese Patent Application Serial Nos. 2015-110532 (filed on May 29, 2015) and 2015-139329 (filed on Jul. 13, 2015), the contents of which are hereby incorporated by reference in their entirety.

TECHNICAL FIELD

The present disclosure relates to a fishing soft lure.

BACKGROUND

As one type of lures (baits) used for fishing, soft lures made of soft materials such as synthetic resins and rubber have been known. Compared to hard lures made of hard materials, soft lures allow deformation and small actions of the lures in accordance with water flow.

For lure fishing, it is preferable that the action of a lure during retrieve imitate living baits as much as possible. Japanese Examined Utility Model Registration Publication No. 3189473 discloses a worm-shaped soft lure with a plurality of wobbling portions that are wobbled by water-flow resistance and provided on a main body. With such configuration, a life-like swimming action is imparted to the lure and it is possible to increase visual stimulation for target fish.

However, when a distance between the two-adjacent wobbling portions aligned in the front-rear direction of the soft lure is relatively small or when the length of the wobbling portion is relatively large, the wobbling portion may hamper movements of the adjacent wobbling portions when the wobbling portions swing in the front-rear direction. When the movements of the wobbling portions are hampered, the visual stimulation for target fish is also decreased. Therefore it is desired to prevent such interference between the wobbling portions. Moreover, wobbling portions situated on a front side in the moving direction (on the upstream of the water flow) of the above-described soft lure with the plurality of wobbling portions can receive enough water-flow resistance, which actively wobbles the wobbling portions on the front side. However wobbling portions situated on a rear side (on the downstream of the water flow) cannot receive sufficient water-flow resistance because the water flow is disrupted by the wobbling portions situated on the front side. Consequently, the movements of the wobbling portions situated on the rear side may be hampered.

SUMMARY

One object of the present disclosure is to provide a soft lure in which interference in movements between adjacent wobbling portions in the front-rear direction is reduced. Another object of the disclosure is to prevent movements of the wobbling portions situated behind the front wobbling portion in the moving direction of the soft lure from being hampered. Other objects of the embodiments of the present disclosure will be apparent with reference to the entire description in this specification.

A fishing soft lure according to one embodiment includes a body; and a plurality of legs projected from a side of the body and arranged along a moving direction of the soft lure. The legs wobble in accordance with water flow when the soft lure moves. The plurality of legs each have a first portion connected with the body and a second portion situated outward from the first portion, at least one leg among the plurality of legs is configured such that the first portion has a thickness in an upper-lower direction larger than a thickness in the moving direction, and the second portion has a thickness in the upper-lower direction larger than a thickness in the moving direction. A fishing soft lure according to one embodiment includes a body; and a plurality of legs projected from a side of the body. The legs wobble in accordance with water flow when the soft lure moves. The plurality of legs at least includes: a first leg; and a second leg situated behind the first leg and on a rear side in the moving direction of the soft lure, at least a portion of a water-flow resisting surface of the second leg that receives water-flow resistance is exposed as viewed from the front in the moving direction.

According to various embodiments of the disclosure, provided is a soft lure in which interference in movements between adjacent wobbling portions in the front-rear direction is reduced or it is possible to prevent movements of the wobbling portions situated behind the front wobbling portion in a moving direction of the soft lure from being hampered.

DESCRIPTION OF THE PREFERRED EMBODIMENTS

Figure 1:
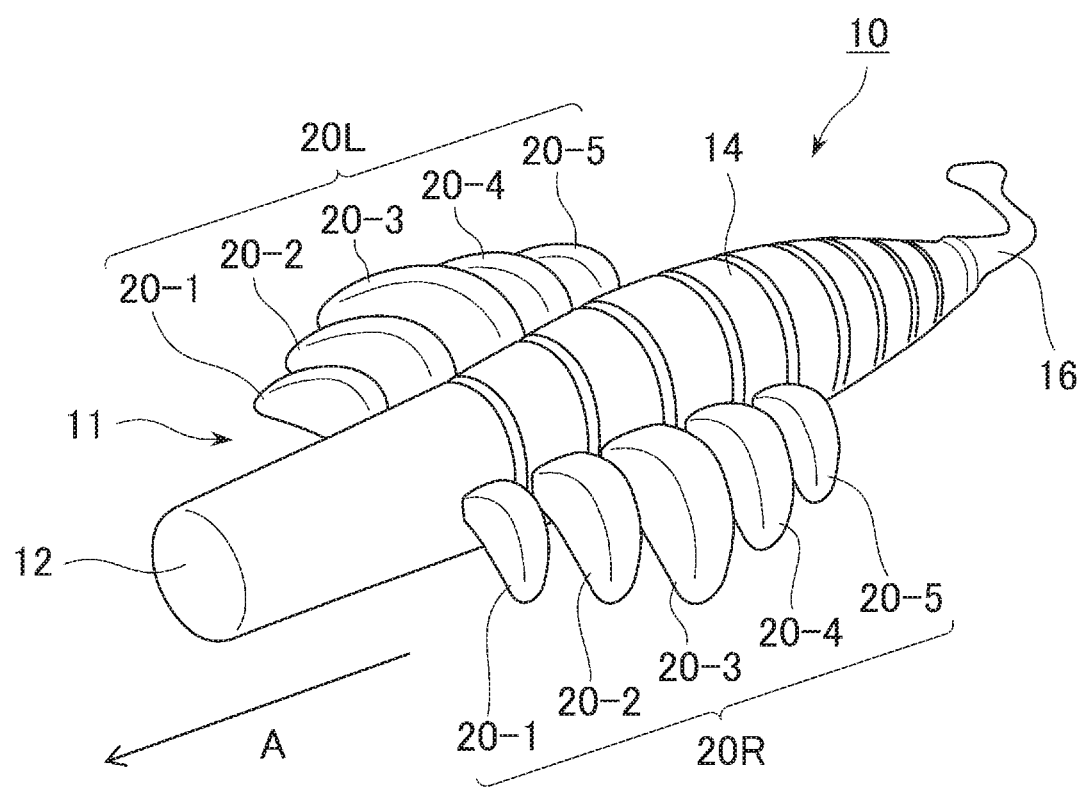
FIG. 1 is a perspective view of a soft lure 10 according to an embodiment.

Various embodiments of the present invention will be hereunder described with reference to the accompanying drawings. In the drawings, the same components are denoted by the same reference numerals.

Figure 2:
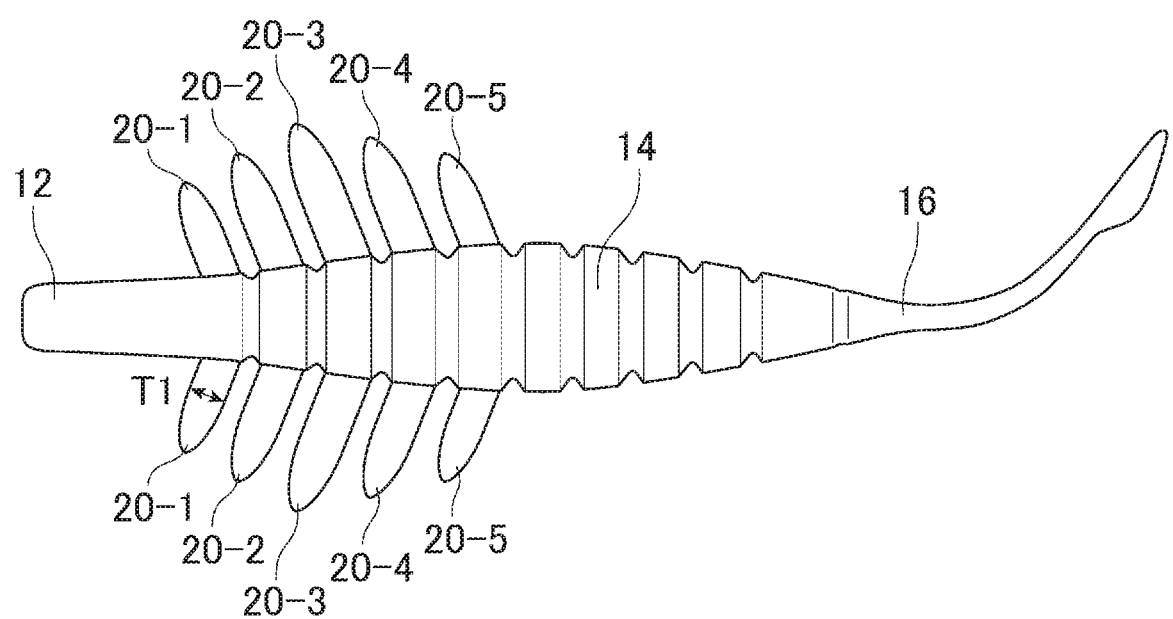
FIG. 2 is a top view of the soft lure 10 according to an embodiment.
Figure 3:
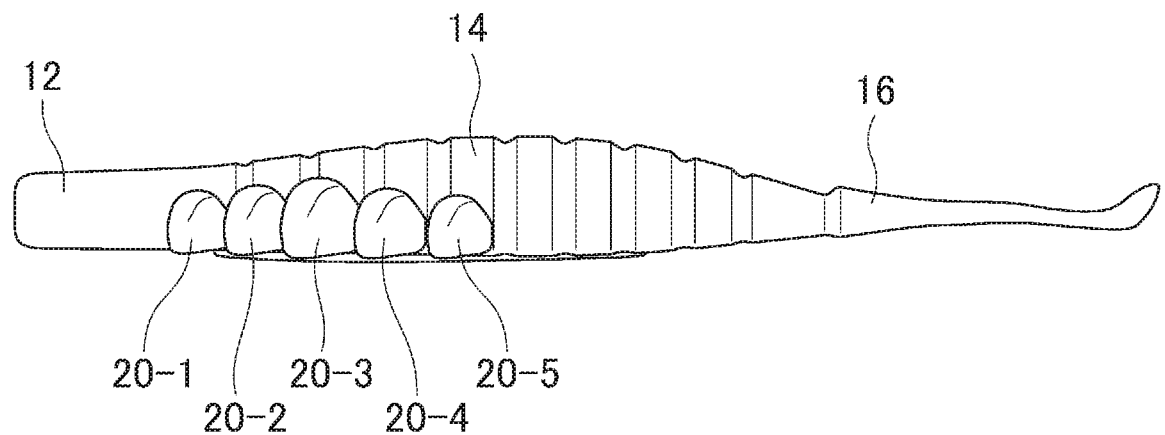
FIG. 3 is a side view of the soft lure 10 according to an embodiment.
Figure 4:
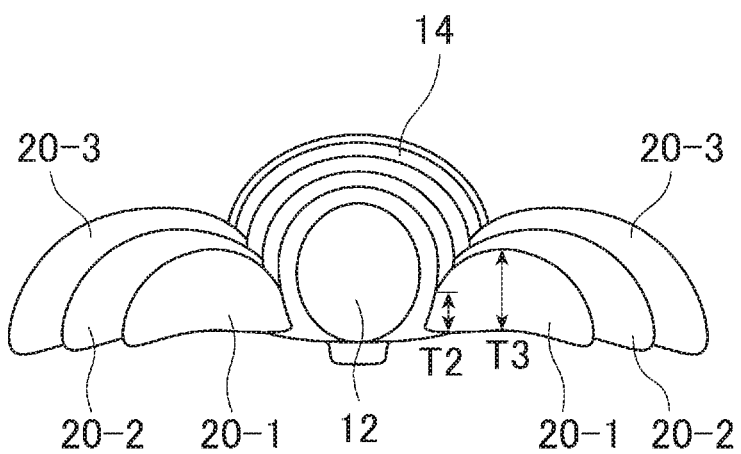
FIG. 4 is a front view of the soft lure 10 according to an embodiment.
Figure 8:
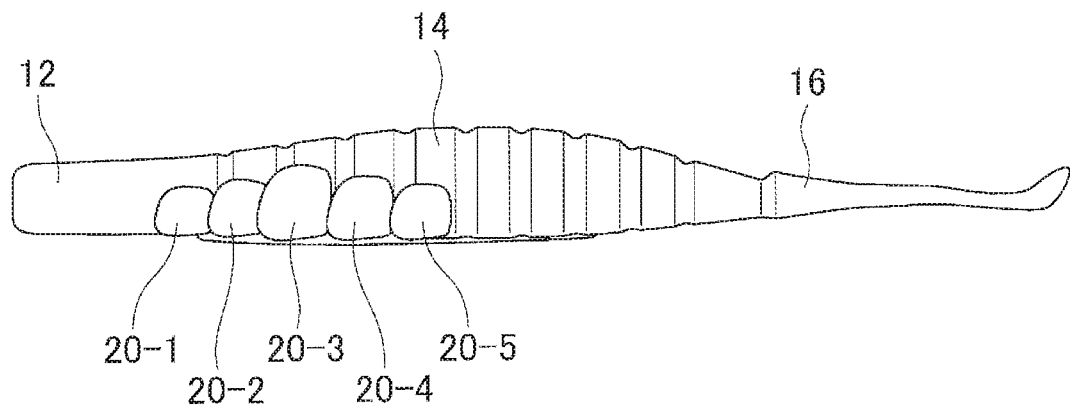
FIG. 8 is a side view of the soft lure 10 according to an embodiment.
Figure 9:
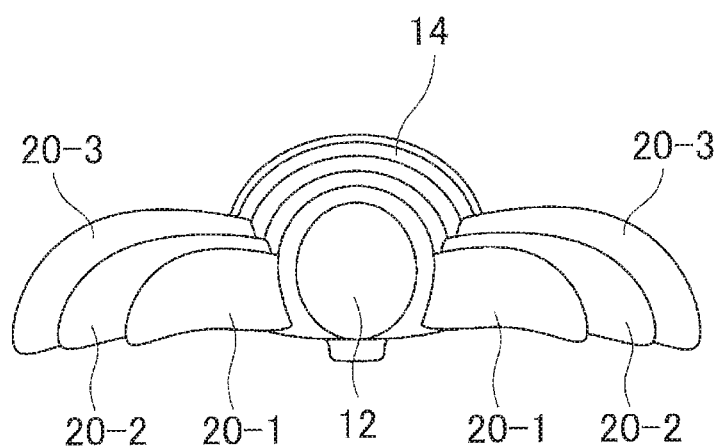
FIG. 9 is a front view of the soft lure 10 according to an embodiment.

FIG. 1 is a perspective view of a soft lure 10 according to an embodiment. FIG. 2 is a top view of the soft lure 10. FIGS. 3 and 8 are side views of the soft lure 10, and FIGS. 4 and 9 are front views of the soft lure 10. The soft lure 10 according one embodiment is a worm-shaped soft lure. Referring to FIG. 1, the soft lure 10 may include a body 11, and a plurality of legs 20 projected symmetrically from left and right sides of the body 11. Here, the illustrated worm-shaped soft lure is merely an example and the embodiment of disclosure may be applied to various types of soft lures made of soft materials.

The soft lure 10 according to one embodiment moves in the direction indicated by the arrow A in FIG. 1 during retrieve. The term "front" and "rear" used herein are based on the moving direction of the soft lure 10 indicated by the arrow A.

The body 11 according to one embodiment may include a head 12 that has a substantially cylindrical shape, a trunk 14 that is formed continuous from the head 12 to extend toward the rear side of the lure in the moving direction, and a tail 16 that has a substantially tapered-string shape and is formed continuous from the trunk 14 to extend toward the rear end of the lure in the moving direction, as illustrated in FIG. 1. In one embodiment, the head 12, the trunk 14, and the tail 16 are integrally formed of a soft material such as synthetic resin and rubber by injection molding or the like. Here, in one embodiment, the length of the body 11 in the moving direction may be 7 to 13 cm, for example, about 10 cm.

Referring to FIG. 2, the width of the trunk 14 in a left-right direction substantially orthogonal to the moving direction increases as getting closer to substantially the middle point of the trunk in the moving direction. Moreover, referring to FIGS. 3 and 8, the height of the trunk 14 in an upper-lower direction substantially orthogonal to the moving direction increases as getting closer to substantially the middle point of the trunk in the moving direction. In this manner, the trunk 14 in one embodiment may have a shape in which the middle portion of the trunk 14 in the moving direction is made wider and bulged.

Moreover, on an outer periphery of the trunk 14, a plurality of annular concaves (grooves, not denoted by the reference numeral) are formed at a predetermined interval in the moving direction. On a lower surface of the trunk 14, formed is a convex portion (not denoted by the reference numeral) that linearly extends in the moving direction of the soft lure. At the tip of the tail, a substantially-triangle hook (not denoted by the reference numeral) is formed.

As illustrated in FIG. 1, the plurality of legs 20 in one embodiment may include five right legs 20R projected from the right side of the trunk 14 and five left legs 20L projected from the left side of the trunk 14 as viewed from the front. The right legs 20R and the left legs 20L are symmetrically arranged. In one embodiment, the legs 20 are formed of the same soft material as the body 11 such as a synthetic resin and rubber and formed integrally with the body 11 by injection molding or the like.

Referring to FIGS. 2, 3, and 8, the right legs 20R and the left legs 20L respectively include a set of five legs 20 arranged in line at a predetermined interval along the moving direction of the lure on the right and left sides of the trunk 14. The set of five legs 20 are situated on the lower edge of the trunk and on the front side with respect to the substantially middle point of the trunk 14 in the moving direction. In one embodiment, the direction in which the legs 20 protrude out is angled toward the front side in the moving direction as shown in FIG. 2. This angle from the left-right direction orthogonal to the moving direction may be from 0° to 45°.

The legs 20 in one embodiment may have the similar shapes to each other such that they have substantially semicircular shapes as viewed from the front in the moving direction (in other words, the sections of the legs substantially orthogonal to the moving direction have semicircular shapes). The thicknesses of the legs 20 in the moving direction (the front-rear direction) may be substantially the same in an area extending from connected portions (jointed portions) with the trunk 14 to substantially the middle portions in the left-right direction. After the middle portions, the thicknesses of the legs decrease toward outer tip portions (the legs get gradually thinner toward their ends). The legs 20 with the semicircular shapes viewed from the front in the moving direction each have the connected portion connected with the trunk 14 where a thickness in the upper-lower direction (for example, the thickness T2 in FIG. 4) is smaller than a thickness of the leg in the front-rear direction (for example, the thickness T1 in FIG. 2). Moreover the legs 20 each have the middle portion where a thickness in the upper-lower direction (for example, the thickness T3 in FIG. 4) is larger than a thickness of the leg in the front-rear direction (for example, the thickness T1 in FIG. 2).

The front sides of the legs 20 in one embodiment are arranged substantially orthogonal to the moving direction and serve as water-flow resisting surfaces that receive the water-flow resistance. The legs 20 in one embodiment may have the similar shapes to each other such that they have substantially semicircular shapes as viewed from the front in the moving direction (in other words, the sections of the legs substantially orthogonal to the moving direction have semicircular shapes), and the front sides of the legs 20 each serve as the water-flow resisting surface. As for the sizes of the water-flow resisting surfaces of the legs 20, a water-flow resisting surface of a second leg 20-2 situated behind a front leg 20-1 is larger than the front leg 20-1, and a water-flow resisting surface of a third leg 20-3 situated behind the second leg 20-2 is larger than the second leg 20-2. The size of the water-flow resisting surface of a fourth leg 20-4 situated behind the third leg 20-3 is substantially same as the second leg 20-2. The size of the water-flow resisting surface of a fifth leg 20-5 situated behind the fourth leg 20-4 is substantially same as the first leg 20-1. In other words, as for the sizes of the water-flow resisting surfaces, the water-flow resisting surface of the fourth leg 20-4 situated behind the third leg is smaller than the third leg 20-3, and the water-flow resisting surface of the fifth leg 20-5 situated behind the fourth leg is smaller than the fourth leg 20-4.

Here, in one embodiment, the legs 20 have the similar semicircular shapes as viewed from the front. Therefore a larger water-flow resisting surface means that the length of the surface in the left-right direction (the length in the projecting direction) is larger and the width in the upper-lower direction (the width of the water-flow resisting surface in the direction orthogonal to the projecting direction) is larger. Here, in one embodiment, the lengths of the legs 20 in the left-right direction may be, for example, in a range of 5 to 20 mm, and the width in the upper-lower direction may be in a range of 2 to 7 mm.

As described above, the legs 20 in one embodiment have the configuration in which the size of the water-flow resisting surface increases from the first leg 20 to the third leg 20 (the length in the left-right direction and the width in the upper-lower direction increase as the first-third legs situated closer to the rear side) but the size of the water-flow resisting surface decreases from the third leg 20 to the fifth leg 20 (the length in the left right direction and the width in the upper-lower direction decrease as the third-fifth legs situated closer to the rear side). With such a configuration, curve arcs are defined by the edges of the legs in the left-right direction (the right edges of the right legs 20R and the left edges of the left legs 20L) and the upper edges of the legs respectively. Consequently the whole shape of the soft lure 10 becomes close to a streamline shape.

Moreover, the size of the water-flow resisting surface increases from the first leg 20-1, the second leg 20-2 to the third leg 20-3 in the stated order from the front. Therefore a portion of the water-flow resisting surface of the second leg 20-2 and a portion of the water-flow resisting surface the third leg 20-3 are exposed as viewed from the front in the moving direction as illustrated in FIGS. 4 and 9.

As for the thicknesses of the legs 20 in the moving direction of the soft lure 10 in one embodiment, a thickness of the second leg 20-2 situated behind the first leg is larger than the front first leg 20-1, and a thickness of the third leg 20-3 situated behind the second leg is larger than the second leg 20-2. Moreover a thickness in the moving direction of the fourth leg 20-4 situated behind the third leg 20-3 is substantially same as the second leg 20-2. A thickness in the moving direction of the fifth leg 20-5 situated behind the fourth leg 20-4 is substantially same as the first leg 20-1. In other words, as for the thickness in the moving direction, the thickness of the fourth leg 20-4 situated behind the third leg 20-3 is smaller than the third leg 20-3, and the thickness of the fifth leg 20-5 situated behind the fourth leg 20-4 is smaller than the fourth leg 20-4.

In one embodiment where the legs 20 are made of the same material, a larger thickness means a higher strength.

Next, actions of the soft lure 10 according to the embodiment during retrieve will be now described. When the soft lure 10 swims under water in accordance with the operation of a user of the fishing rod, the water-flow resisting surfaces of the legs receive the water-flow resistance generated by the movement of the soft lure 10 and the legs 20 are wobbled by the resistance. Here, since each leg 20 has a thickness in the upper-lower direction smaller than a thickness in the front-rear direction at the connected portion connected with the trunk 14, up and down movements of the legs 20 with the connected portions as pivot points are facilitated. In this way, the movements of adjacent legs 20 in the front-rear direction are less likely to be hampered. Furthermore, the soft lure 10 that has the legs 20 wobbling up and down can realize actions similar to actual worms. Moreover, each leg 20 has a thickness in the upper-lower direction larger than a thickness in the front-rear direction at the substantially middle portion of the leg in the left-right direction. Therefore the leg 20 can receive enough water-flow resistance.

Generally, larger the size of the water-flow resisting surface and larger the length of the leg 20 in the left-right direction, larger the amount of wobbling becomes during retrieve of the soft lure 10. Therefore in a soft lure 10 with a larger water-flow resisting surface, there is a high possibility that movements of adjacent legs 20 are hampered. However, in the soft lure 10 according to the embodiment, legs 20 with larger water-flow resisting surfaces and larger lengths in the left-right direction have larger thicknesses in the moving direction or higher strengths so that the amount of wobbling is reduced Consequently the movements of adjacent legs 20 in the front-rear direction are less likely to be hampered.

Moreover, the first leg 20-1 disturbs water flow so that the legs 20 situated behind the first leg 20-1 receive less water-flow resistance during retrieve of the soft lure 10. However, the soft lure 10 according to the embodiment has the second leg 20-2 and the third leg 20-3 that have the water-flow resisting surfaces larger than that of the front leg 20 and a portion of the water-flow resisting surface of the second and third legs is exposed as viewed from the front in the moving direction. Therefore, according to the embodiment, the second and third legs have the substantially same sized water-flow resisting surfaces as the front leg 20, and they receive more water-flow resistance compared to those in which the water-flow resisting surfaces are not exposed as viewed from the front. Consequently, in the soft lure 10 according to the embodiment, movements of the second leg 20-2 and the third leg 20-3 situated behind the front leg are less likely to be hampered.

Figure 5:
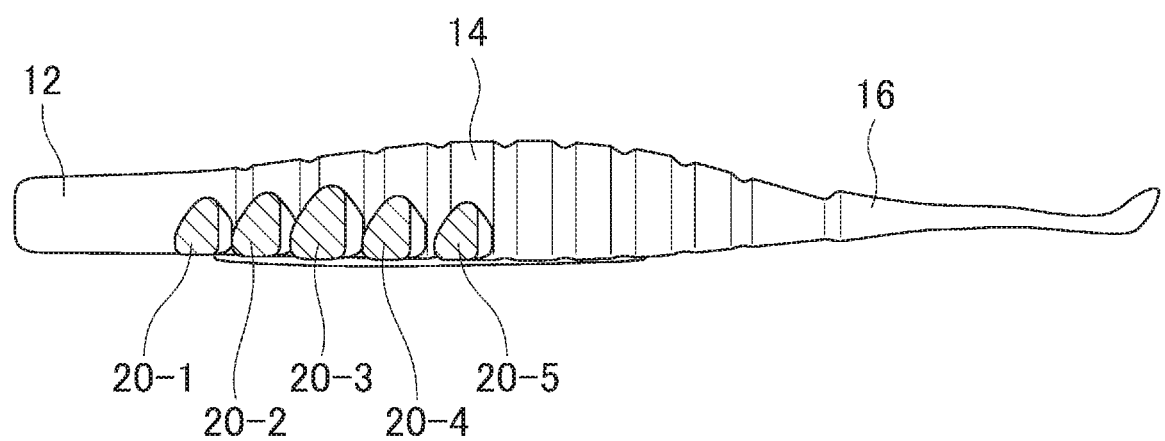
FIG. 5 is a sectional view of legs 20 of a soft lure according to another embodiment.

The water-flow resisting surface provided on the front side of each leg 20 is arranged substantially orthogonal to the moving direction in the above-described embodiment. Alternatively, the leg 20 may be configured such that the water-flow resisting surface is inclined in the moving direction (the front-rear direction) with respect to a plane substantially orthogonal to the moving direction. FIG. 5 is a sectional view of the legs 20 of a soft lure according to such an embodiment. Referring to FIG. 5, in this embodiment, the legs 20 of the soft lure may have water-flow resisting surfaces that are slanted upward at a predetermined angle (for example, 40°). When the legs 20 with the slanted resisting surfaces receive water-flow resistance, downward forces tend to work on the resisting surfaces, which promotes the movements of the legs 20 in the upper-lower direction.

Figure 6:
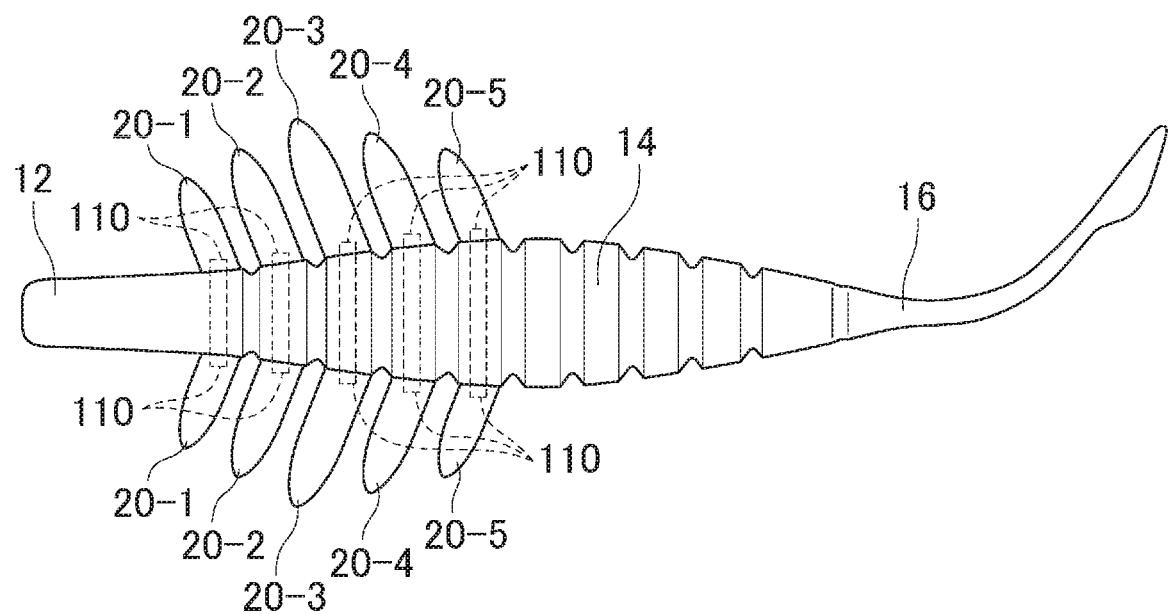
FIG. 6 is a top view of a soft lure according to another embodiment.

In another embodiment, modification can be further made to the lure in order to enhance the movements of the legs 20 in the upper-lower direction. For example, plates may be provided at the connected portions (jointed portions) of the legs 20 with the trunk 14. Each plate has a cross-section in which a length in the upper-lower direction is smaller than a length in the moving direction in order to enhance the movement of each leg 20 in the upper-lower direction. FIG. 6 is a top view of the soft lure according to such an embodiment. Referring to FIG. 6, such a plate 110 having the above-described cross-section is provided in each pair of the left-right legs 20. The plate 110 is embedded in the trunk 14 and its left and right ends reach the jointed portions (insides) of the left and right legs 20 respectively. Movements of the legs 20 in the front-rear direction are restricted by the plates 110 and consequently the movements of the legs 20 in the upper-lower direction are enhanced in the soft lure according to the embodiment.

Figure 7:
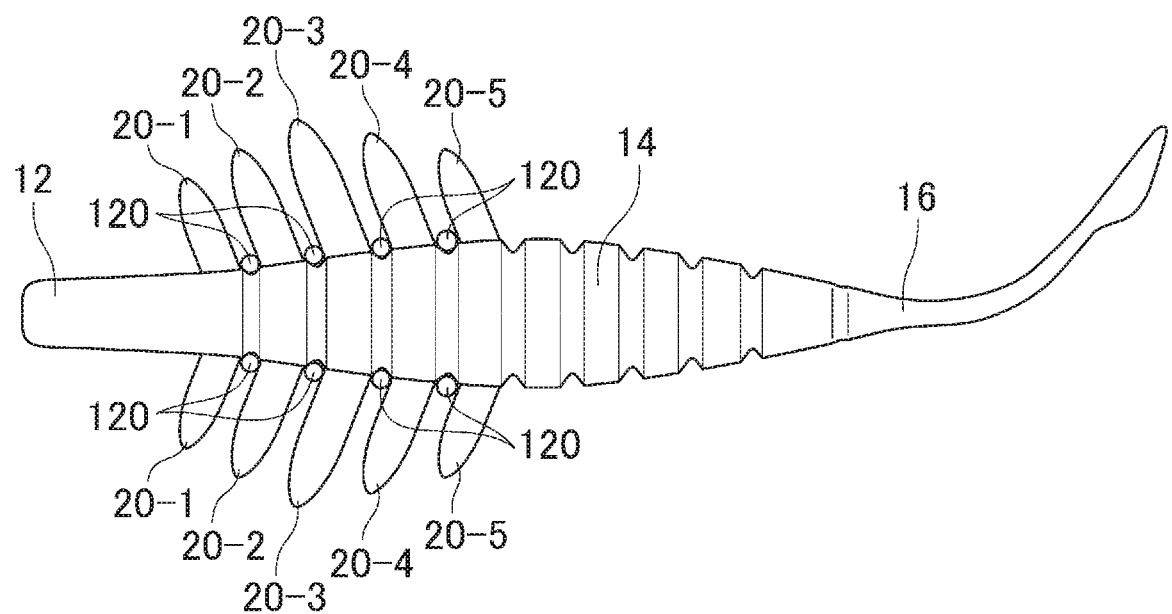
FIG. 7 is a top view of a soft lure according to another embodiment.

Alternatively, a reinforcement member may be provided in front and rear of the connected portion of each leg 20 to enhance the movement of the leg 20 in the upper-lower direction. FIG. 7 is a top view of the soft lure according to this embodiment. The soft lure according to the embodiment may have a reinforcement member 120 that has a substantially column shape and is provided on the side of the trunk 14 between two adjacent legs 20 in the front-rear direction. The reinforcement members 120 may be formed of the same soft material as the body 11 and legs 20 such as a synthetic resin and rubber and formed integrally with the body 11 and/or the legs 20 by injection molding or the like. Movements of the jointed portions of the legs 20 in the front-rear direction are restricted by the reinforcement members 120 and consequently movements of the legs 20 in the upper-lower direction are enhanced in the soft lure according to the embodiment. The reinforcement member 120 may be formed in any shape provided that it can restrict the movement of the jointed portion of each leg 20.

The legs 20 are configured such that the size of the water-flow resisting surface decreases from the third leg 20 to the fifth leg 20 (the length in the left-right direction and the width in the upper-lower direction decrease as the third-fifth legs situated closer to the rear side) in the above-described embodiments in order to achieve a streamline shape of the soft lure 10. Alternatively, in another embodiment, the third to fifth legs 20 may each have a water-flow resisting surface whose size increases as situated closer to the rear end of the lure in the same manner as the first to third legs 20. In this case, a portion of the water-flow resisting surface of each leg 20 including the fourth and fifth legs 20 is exposed as viewed from the front in the moving direction. Therefore all the legs 20 receive water-flow resistance and movements of the legs are less likely to be hampered.

The legs 20 in the above-described embodiments have the substantially semicircular similar shapes as viewed from the front. However, the shapes of the legs 20 viewed from the front are not limited to the semicircular shape but can be selected from various shapes. Moreover, shapes of the legs are not necessarily similar to each other. For example, the widths of the water-flow resisting surfaces in the upper-lower direction of the legs 20 may be substantially the same, but the lengths in the left-right direction may be made longer for the legs 20 that have larger water-flow resisting surfaces. Alternatively, the left-right lengths of the water-flow resisting surfaces may be substantially the same but the widths in the upper-lower direction may be made longer for the legs 20 that have larger water-flow resisting surfaces.

The legs 20 that are situated behind the front leg 20 and have larger water-flow resisting surfaces than the front leg 20 (more specifically, the second leg 20-2 and the third leg 20-3) are configured such that a portion of the water-flow resisting surface is exposed as viewed from the front in the moving direction in the above-described embodiments. However, in another embodiment, the legs 20 situated behind the front leg may have water-flow resisting surfaces with sizes same as or smaller than the front leg 20 and may be configured such that a portion of the water-flow resisting surface is still exposed as viewed from the front in the moving direction. For instance, the legs 20 can be inclined upward or downward in the projecting direction of the legs 20. By varying the inclination angles of the adjacent legs 20 in the front-rear direction, it is possible to expose at least a portion of the water-flow resisting surface of each leg 20 behind the front leg as viewed from the front in the moving direction.

The legs 20 with larger water-flow resisting surfaces and larger lengths in the left-right direction have larger thicknesses in the moving direction or higher strengths in the above-described embodiments. Alternatively, the strengths of the legs 20 can be increased by other methods without increasing the thickness in the moving direction. For instance, a support member to increase the strength of the leg 20 may be provided or a different higher-strength material is used for the legs 20 that have larger water-flow resisting surfaces and larger lengths in the left-right direction.

The soft lure 10 according to various embodiments of the invention describe above may have the body 11 and the plurality of legs 20. The legs 20 each project out from a side of the body 11 and are arranged along the moving direction of the soft lure 10. The legs 20 wobble in accordance with water flow when the soft lure 10 moves. At least one leg 20 among the plurality of legs 20 has the connected portion connected with the body 11 (trunk 14) where the thickness in the upper-lower direction is smaller than the thickness in the moving direction, and has the substantially middle portion situated outer from the connected portion. In the middle portion of the leg, the thickness in the upper-lower direction is larger than the thickness in the moving direction. Movements of such legs 20 in the upper-lower direction are enhanced and therefore it is possible to reduce interference in the front-rear movements between adjacent legs 20 in the front-rear direction.

The soft lure 10 according to various embodiments of the invention describe above may have the body 11 and the plurality of legs 20. The legs 20 each project out from a side of the body 11 and are wobbled by water-flow resistance generated when the soft lure 10 moves. At least a portion of the water-flow resisting surface of the second leg 20-2 situated behind the first leg 20-1 and the third leg 20-3 situated behind the second leg 20-2 is exposed as viewed from the front in the moving direction. Therefore, compared to a lure in which the water-flow resisting surfaces of the legs situated behind the front leg are not exposed as viewed from the front in the moving direction, the legs 20 situated behind the front leg according to the embodiments receive more water-flow resistance and consequently it is possible to prevent movements of the legs 20 (wobbling portions) situated behind the front leg from being hampered.

Embodiments of the present invention are not limited to the above embodiments but various modifications are possible within a spirit of the invention. For example, the number and arrangement of the legs 20 may be different from the above-described embodiments. More specifically, two rows of the legs 20 are arranged along the moving direction of the soft lure 10 in the above-described embodiments. However, a row or more than two rows of the legs 20 may be provided. When three or more rows of the legs 20 are provided on the soft lure 10, at least a part of the legs 20 easily comes into target's field of view at any positional relationship between the target fish and the soft lure 10.

Furthermore, at least a part of the legs 20 may have the jointed portions (connected portions with the trunk 14) that have the widths in the upper-lower direction are smaller than the widths in the moving direction. Movements of the legs 20 with such a configuration are promoted in the upper-lower direction rather than the front-rear direction so that it is possible to move the lure like living baits while preventing the movements of the adjacent legs 20 from being hampered.

What is claimed is:

1. A fishing soft lure, comprising:
a body; and
a plurality of legs projected from a side of the body and arranged along a moving direction of the soft lure, the moving direction being a direction relative to a longitudinal direction of the body, the legs configured for wobbling up and down in an upper-lower direction in accordance with water flow when the soft lure moves, the upper-lower direction being substantially orthogonal to the moving direction,
wherein the plurality of legs each have a first portion connected with the body and a second portion situated outward from the first portion, the first portion including a joint portion that connects the first portion to the body, at least one leg among the plurality of legs is configured such that the joint portion of the first portion has a thickness in the upper-lower direction smaller than a thickness in the moving direction, and the second portion has a thickness in the upper-lower direction larger than a thickness in the moving direction, and
wherein a plate is provided in the first portion of the at least one leg, and the plate has a cross-section in which a length in the upper-lower direction is smaller than a length in the moving direction.

2. The soft lure of claim 1, wherein the at least one leg has a front side that receives the water flow, and the front side is inclined in the moving direction with respect to a plane substantially orthogonal to the moving direction.

3. The soft lure of claim 1, wherein a reinforcement member is provided on a front side and/or a rear side of the first portion of the at least one leg.

4. The soft lure of claim 1, wherein the plurality of legs are provided symmetrically on one side and the other side of the body.

5. A fishing soft lure, comprising:
a body; and
a plurality of legs projected from a side of the body, the legs configured for wobbling up and down in au upper-lower direction in accordance with water flow when the soft lure moves in a moving direction, the moving direction being a direction relative to a longitudinal direction of the body and the upper-lower direction being substantially orthogonal to the moving direction,
wherein the plurality of legs at least includes:
a first leg; and
a second leg situated behind the first leg and on a rear side in the moving direction of the soft lure, at least a portion of a water-flow resisting surface of the second leg that receives water flow resistance is exposed as viewed from a front side in the moving direction,
wherein the first leg is configured such that a first jointed portion connects the first leg to the body and wherein the first jointed portion has a thickness in the upper-lower direction smaller than a thickness in the moving direction,
wherein the second leg is configured such that a second jointed portion connects the second leg to the body and wherein the second jointed portion has a thickness in an upper-lower direction smaller than a thickness in the moving direction,
wherein a middle portion of the second leg has a thickness that is greater than a thickness of a middle portion of the first leg, such that the middle portion of the second leg is exposed and visible as viewed from the front side in the moving direction, and
wherein a plate is provided in the first portion of the at least one leg, and the plate has a cross-section in which a length in the upper-lower direction is smaller than a length in the moving direction.

6. The soft lure of claim 5, wherein at least one portions of the plurality of legs including the first leg and the second leg are arranged in line along the moving direction.

7. The soft lure of claim 5, wherein the second leg has the water-flow resisting surface larger than a water-flow resisting surface of the first leg.

8. The soft lure of claim 5, wherein a length of the second leg in a projecting direction is larger than a length of the first leg in the projecting direction, the projecting direction being substantially horizontal to the moving direction and the longitudinal direction of the body.

9. The soft lure of claim 5, wherein a strength of the second leg is higher than the first leg.

10. The soft lure of claim 5, wherein the plurality of legs are provided symmetrically on one side and the other side of the body.

11. The soft lure of claim 5, wherein the plurality of legs further includes a third leg comprising a third jointed portion connecting the third leg to the body, the third leg being situated behind both the first leg and the second leg in the moving direction of the soft lure, wherein a middle portion of the third leg has a thickness that is greater than a thickness of the middle portion of the second leg, such that the middle portion of the third leg is exposed and visible as viewed from the front side in the moving direction, the thickness of the third leg comprising a water-flow resisting surface that receives water-flow resistance from its front side in the moving direction.

12. The soft lure of claim 11, wherein plates are embedded in the body such that they extend through the body in a lateral direction, wherein each of the first, second, and third legs have a portion of one of the plates therein, and wherein each plates has a cross-section in which a length in the upper-lower direction is smaller than a length in the moving direction.

13. The soft lure of claim 11, wherein reinforcement members are provided between the first leg and the second leg and between the second leg and the third leg, adjacent to the body and near the jointed portions thereof, the reinforcement members being configured to restrict movement of the first, second, and third legs in the moving direction thereby enhancing movement of the first, second, and third legs in the upper-lower direction.

14. The soft lure of claim 11, wherein the plurality of legs further includes a fourth leg comprising a fourth jointed portion connecting the fourth leg to the body, the fourth leg being situated behind the first, second, and third legs in the moving direction of the soft lure, wherein a middle portion of the fourth leg has a thickness that is less than a thickness of the middle portion of the third leg, such that the middle portion of the fourth leg is obscured when viewed from the front side in the moving direction.

15. A fishing soft lure, comprising:
a body; and
a plurality of legs projecting from right and left sides of the body and arranged along a moving direction of the soft lure, the moving direction being a direction relative to a longitudinal direction of the body, the legs configured for wobbling in an upper-lower direction in accordance with water flow when the soft lure moves, the upper-lower direction being substantially orthogonal to the moving direction,
wherein the plurality of legs each have a first portion connected with the body and a second portion situated outward from the first portion, the first portion including a joint portion that connects the first portion to the body, wherein at least one leg on the right side of the body and at least one leg on the left side of the body is configured such that the joint portion has a thickness in an upper-lower direction smaller than a thickness in the moving direction and the second portion has a thickness in the upper-lower direction larger than a thickness in the moving direction,
wherein a plate is provided in the at least one leg on the right side and the at least one leg on the left side, and the plate has a cross-section in which a length in the upper-lower direction is smaller than a length in the moving direction.

16. The soft lure of claim 15, wherein the plate is embedded in the body such that the plate extends through the body in a lateral direction and wherein right and left ends of the plate are positioned inside the joint portions of the at least one leg on the right side and the at least one leg on the left side.

* * * * *